United States Patent
Salyer

(10) Patent No.: US 8,727,271 B2
(45) Date of Patent: May 20, 2014

(54) AIRCRAFT USING TURBO-ELECTRIC HYBRID PROPULSION SYSTEM

(76) Inventor: Ival O. Salyer, Flowery Branch, GA (US)

(*) Notice: Subject to any disclaimer, the term of this patent is extended or adjusted under 35 U.S.C. 154(b) by 1590 days.

(21) Appl. No.: 11/972,879

(22) Filed: Jan. 11, 2008

(65) Prior Publication Data
US 2009/0145998 A1    Jun. 11, 2009

(51) Int. Cl.
*B64D 35/04* (2006.01)
*B64C 27/00* (2006.01)

(52) U.S. Cl.
USPC .......................................... 244/60; 244/17.11

(58) Field of Classification Search
USPC .................. 244/17.11, 53 R, 17.23, 60, 55
See application file for complete search history.

(56) References Cited

U.S. PATENT DOCUMENTS

| | | | | |
|---|---|---|---|---|
| 1,734,263 A * | 11/1929 | Many | | 244/6 |
| 2,462,201 A * | 2/1949 | Kilgore et al. | | 244/60 |
| 2,723,531 A * | 11/1955 | Wosika et al. | | 60/718 |
| 3,441,116 A * | 4/1969 | Quenneville | | 192/48.6 |
| 3,455,182 A * | 7/1969 | Kelley | | 74/661 |
| 3,720,387 A * | 3/1973 | Foote | | 244/17.25 |
| 4,293,777 A | 10/1981 | Gamell | | |
| 4,485,310 A | 11/1984 | de Valroger | | |
| 4,605,185 A * | 8/1986 | Reyes | | 244/60 |
| 4,610,410 A | 9/1986 | Sibley | | |
| 4,702,437 A * | 10/1987 | Stearns, Jr. | | 244/17.11 |
| 4,709,882 A * | 12/1987 | Galbraith | | 244/53 R |
| 4,720,059 A * | 1/1988 | Stearns, Jr. | | 244/17.11 |
| 4,955,560 A * | 9/1990 | Nishina et al. | | 244/53 R |
| 5,823,468 A | 10/1998 | Bothe | | |
| 6,655,631 B2 | 12/2003 | Austen-Brown | | |
| 6,725,643 B1 | 4/2004 | Paul | | |
| 7,857,254 B2 * | 12/2010 | Parks | | 244/12.4 |
| 2002/0145076 A1 * | 10/2002 | Alford | | 244/60 |
| 2009/0140095 A1 * | 6/2009 | Sirohi et al. | | 244/17.19 |

OTHER PUBLICATIONS

Hiller X-18 Helicopter—http://avia.russian.ee/helicopters_eng/hiller_x-18.php.
The Turbo-Electric VTOL Aircraft, Supplement Information—http://stinet.dtic.mil/oai.

* cited by examiner

*Primary Examiner* — Tien Dinh
(74) *Attorney, Agent, or Firm* — Dinsmore & Shohl LLP

(57) ABSTRACT

An air vehicle incorporating a hybrid propulsion system. The system includes a gas turbine engine as a first motive power source, and one or more battery packs as a second motive power source. Through selective coupling to a DC electric motor that can in turn be connected to a bladed rotor or other lift-producing device, the motive sources provide differing ways in which an aircraft can operate. In one example, the gas turbine engine can provide operation for a majority of the flight envelope of the aircraft, while the battery packs can provide operation during such times when gas turbine-based motive power is unavailable or particularly disadvantageous. In another example, both sources of motive power may be decoupled from the bladed rotor such that the vehicle can operate as an autogyro.

10 Claims, 8 Drawing Sheets

AIRCRAFT USING TURBO-ELECTRIC HYBRID PROPULSION SYSTEM

BACKGROUND OF THE INVENTION

The present invention relates generally to a hybrid propulsion system for aircraft, and more particularly to a gas turbine-based propulsion system that can provide primary motive power to the aircraft over a portion of the aircraft's flight envelope, and a stored electric-based power system that is selectively coupled to the gas turbine such that during other portions of the aircraft's flight envelope, the electric-based power system can provide the aircraft with its primary motive power.

Aircraft are broadly categorized as either fixed-wing vehicles (such as an airplane) or rotary-wing vehicles (such helicopters and autogyros, the latter also referred to as autogiros or gyrocopters). Gas turbine engines are widely used to power both the fixed-wing and rotary wing forms of aircraft, where fixed-wing vehicles often employ turbofan, turbojet and turboprop variants, and rotary-wing vehicles often employ turboshaft variants. In all circumstances, the basic gas generator hardware is common, including a compressor, a combustor and turbine, where the compressor and turbine rotate on a generally common shaft (or set of concentric shafts) such that energy extracted from the turbine is used to power the compressor. Turbofans are very similar to turbojets, with the exception that they typically include an additional fan located upstream of the compressor. A turboprop engine, in addition to including the respective turbofan or turbojet componentry, also includes a fore-mounted drive shaft that spins in common with the shaft of the compressor and turbine. To match the high rotational speed of the compressor and turbine to that of a propeller, a gearbox is inserted between the front end of the drive shaft and a propeller shaft. Turboshafts also include similar components to the turbofans and turbojets, and additionally include a shaft rotatably responsive to another turbine stage.

In turboshaft engines, power generated by the gas generator (which is spinning about a generally horizontal axis) is transferred to the shaft (which is spinning about a generally vertical axis such that it can turn a rotor made up of a series of blades that radially extend from a central hub) through a gearing mechanism, such as a bevelled or worm gear. Shaft horsepower needs to produce a particular rotor rotational speed varies depending on the aircraft type, size and intended mission. For example, the CH-47 Chinook is a popular twin-rotor helicopter designed for commercial and military heavy lifting. Rotor blade power requirements for helicopters such as this may be in the range of five thousand horsepower, while speed requirements of around two hundred and twenty five revolutions per minute (RPM) are typical.

Despite their widespread use, conventional gas turbine-based propulsion systems have significant drawbacks for certain types of aircraft. For example, in the event a turboshaft engine fails, a helicopter, gyrocopter or other inherently unstable aircraft has no way of returning to earth under its own power, and at best can expect to have to endure a controlled crash landing. Likewise, if a helicopter employing a turboshaft engine as propulsive power is flying or hovering over an area where terrorists, armed conflict or related hostilities exist, the extreme heat put out by the engine or engines may make the helicopter exceedingly vulnerable to attack from infrared (IR) seeking weaponry. Accordingly, there exists a need for a propulsion system that overcomes these shortcomings.

BRIEF SUMMARY OF THE INVENTION

These needs are met by the present invention, where in accordance with a first aspect of the present invention, an aircraft employing a hybrid propulsion system is disclosed. The aircraft includes a fuselage, body or related airframe, a thrust-producing device coupled to the fuselage, and a hybrid propulsion system configured to provide power to operate the thrust producing device. Cooperation between the propulsion system and the thrust producing device provides motive power to the aircraft. In one form, the thrust-producing device is a bladed rotor, where the rotating blades produce both lift and thrust if oriented properly relative to the aircraft. In the present context, the terms "lift" and "thrust", while recognized in general aeronautical terms as representing two of the four primary forces acting upon an aircraft in flight (the other two being drag and weight), are used somewhat interchangeably as those forces that contribute to the craft's upward or forward movement. Circumstances in the present disclosure where lift and thrust retain their traditionally-accepted aeronautical definitions will be apparent from the context. For example, the rotation of a bladed rotor that is coupled to a helicopter will be understood to provide one or both of lift and thrust, depending at least in part on the orientation of the rotor relative to the aircraft to which it is attached.

The propulsion system attains its hybrid nature by possessing two forms of power. The first comes from a gas turbine (i.e., jet) engine, while the second comes from an electric storage device. Such hybrid power sources may be tailored for use over various parts of the aircraft flight envelope where each exhibits relative strengths or advantages. In the present context, the flight envelope includes various parts of the flight path that the aircraft may be expected to encounter over the course of its operation. By way of non-limiting example, such parts include startup, ground loiter, takeoff, cruise, loiter/hover and landing. As such, the gas turbine engine can be used to provide power to the thrust and/or lift producing device over a portion of the aircraft's flight envelope that requires long-term power, such as during aircraft cruise. Likewise, the electric storage device can be used to power the aircraft over a portion of the aircraft's flight envelope that benefits from reduced thermal or pollutant emissions from the gas turbine engine, such as hovering, loitering or the like. An electrical generator is also placed in cooperation with the shaft so that mechanical power from the gas turbine is converted to electric power for use by an electric motor that is coupled to the thrust producing device. The presence of the electrical generator allows the electric motor to accept a common form of power (i.e., electric current) from either the gas turbine engine or the electric storage device.

Optionally, the electric storage device comprises at least one battery, which may be in the form of a single battery or part of a battery pack. The gas turbine engine may further include a transmission shaft that extends from its main rotational shaft (i.e., the one or ones coupled to the engine's compressor or turbine) to deliver power to the electrical generator. A clutch can be disposed on or with the shaft such that during the portion of the aircraft's flight envelope where that power generated in the gas turbine engine is to be used, the clutch provides the necessary connectivity between the engine and the electrical generator. The battery or other electric storage can be kept charged during the portion of the aircraft's flight envelope where the gas turbine engine is providing the aircraft's power, as excess power from the gas turbine engine can be fed through the electrical generator to the battery. In one form, the electric motor is a DC motor. As stated above, the thrust producing device can be a bladed rotor oriented in such a way that upon attaining a minimum rotational speed, it possesses at least one of lift and thrust attributes. During the portion of the aircraft's flight envelope where the power to operate the thrust producing device is coming from the electric storage device, the gas turbine engine can be rendered substantially inoperable such that its operation is reduced or turned off entirely, where in the present context, the term "substantially" refers to an arrangement of elements or features that, while in theory would be expected to exhibit exact correspondence or behavior, may, in practice embody something less than exact. As such, the term denotes the degree by which a quantitative value, measurement or other related representation may vary from a stated reference without resulting in a change in the basic function of the subject matter at issue. A controller may be used to provide some automation to the operation of the aircraft. Included is the ability to vary operation of the aircraft between a first and second portion of its flight envelope. In a more particular form, the controller can be used in conjunction with actuation equipment to provide full robotic control of the aircraft over many or all segments of the aircraft flight envelope, including take-off and landing. Such full control is especially beneficial in unmanned aircraft configurations.

According to another aspect of the present invention, a rotary wing aircraft is disclosed. The aircraft includes a fuselage, one or more bladed rotors cooperative with the fuselage, and a hybrid propulsion system coupled to the fuselage and the one or more bladed rotors. The propulsion system includes a gas turbine engine, an electrical generator, an electric storage device and an electric motor selectively coupled to at least one of the electrical generator and the electric storage device. The generator is coupled to the gas turbine engine so that mechanical power received from the engine can be converted by the electrical generator to electric power for use by the electric motor. In this way, the generator normalizes the form of energy being input into the electric motor. During one (for example, a first) portion of a flight envelope of the aircraft, the gas turbine engine and the one or more rotors provide at least a majority of motive power to the aircraft, while during another (for example, the second) portion of the flight envelope, the electric storage device and the rotor or rotors provide at least a majority of the motive power to the aircraft.

Optionally, the aircraft is a helicopter or gyrocopter. In either configuration, the aircraft may include numerous lift rotors. Such rotors may be in tandem (i.e., front to back) or side-by-side, as well as stacked. As before, the electric storage device may be made up of one or more batteries. As with the previous aspect of the invention, the rotary wing aircraft may include fully automated control through operation of a controller (for example, a computer-based device) with associated actuation equipment to robotically manage some or all portions of the aircraft mission. Such controller and ancillary equipment could also be configured to cooperate with a transceiver or related communication system to allow for remote control of the aircraft.

According to another aspect of the present invention, a method of providing motive power to an aircraft is disclosed. The method includes coupling a hybrid propulsion system to a thrust producing device and operating the system such that power produced by it operates the thrust producing device. The hybrid propulsion system includes a gas turbine engine, an electric storage device configured to deliver an electric current and an electrical generator responsive to the gas turbine engine such that power produced by the operation of the engine is converted into electric current. In addition, the system includes an electric motor selectively responsive to the generator and the electric storage device. By having the electric motor be responsive to electric current irrespective of its source (i.e., the gas turbine engine or the electric storage device), the use of redundant componentry is avoided.

Optionally, the thrust producing device operates by rotating in response to power provided to it by the electric motor. Furthermore, the thrust producing device is configured to provide both lift and thrust to the aircraft, which may be configured as a helicopter or gyrocopter. In addition, the electric storage device can be made up of one or more batteries. In a particular form, the operation of one of the gas turbine engine and the electric storage device comprises operating the electric storage device substantially exclusively. During such mode of operation, the gas turbine engine can be turned off. In a related mode of operation, operation of the gas turbine engine can be curtailed enough so that one or more of its thermal output, pollutant output and ability to produce useful thrust for the aircraft is substantially ceased. In addition, the operation of one of the gas turbine engine and at least one battery comprises operating the gas turbine engine such that excess power produced by it is conveyed to the electric storage device through the electrical generator to maintain the electric storage device in a substantially charged condition. As with the previous aspects, computerized control may be affected through a controller and associated actuators, as well as through cooperation of the same with a transceiver to allow remote control, depending on the mission, aircraft configuration or like considerations.

BRIEF DESCRIPTION OF THE SEVERAL
VIEWS OF THE DRAWINGS

The following detailed description of the present invention can be best understood when read in conjunction with the following drawings, where like structure is indicated with like reference numerals and in which.

DETAILED DESCRIPTION OF THE PREFERRED EMBODIMENTS

Figure 1:
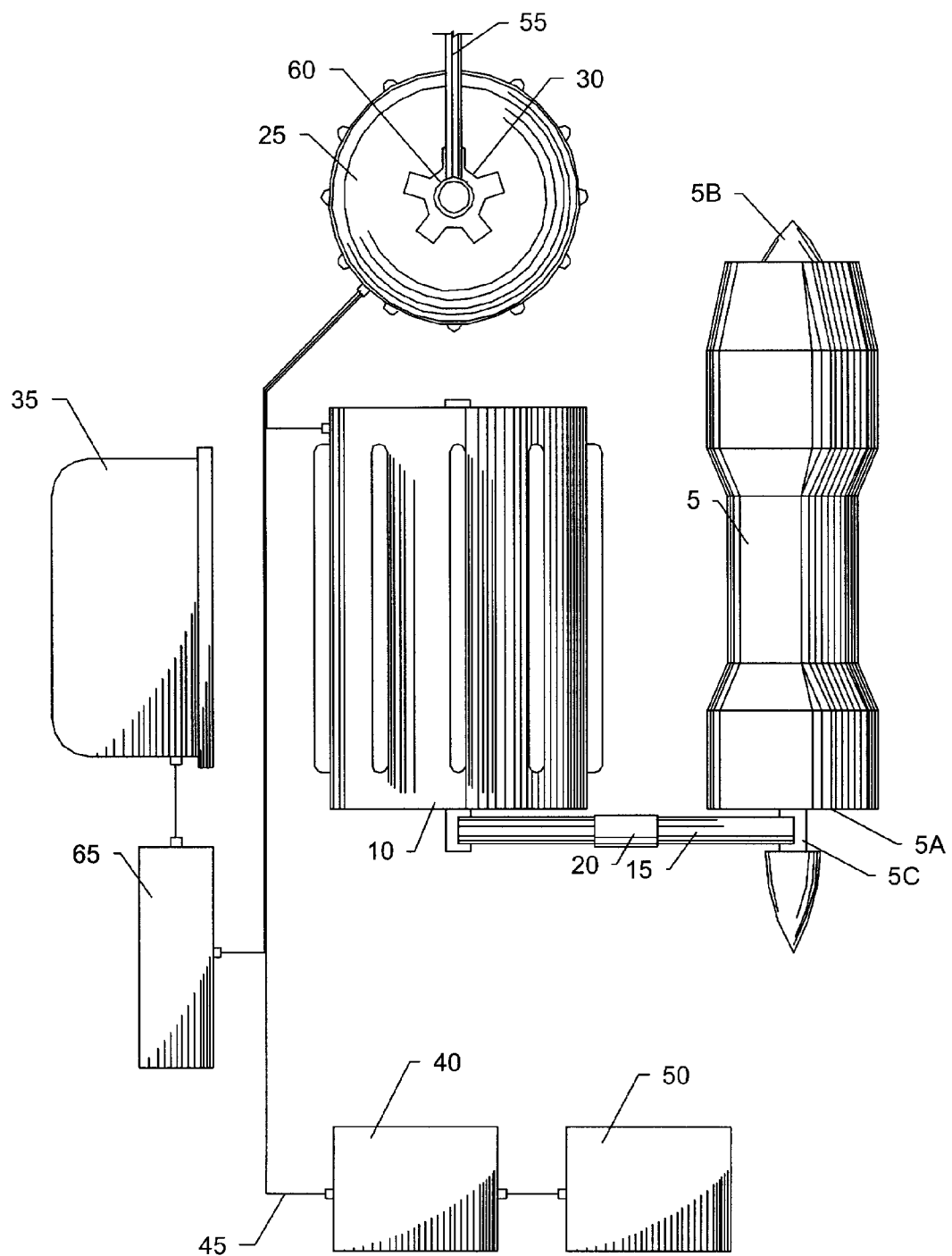
FIG. 1 shows schematically a hybrid propulsion system according to an embodiment of the present invention.
Figure 7:
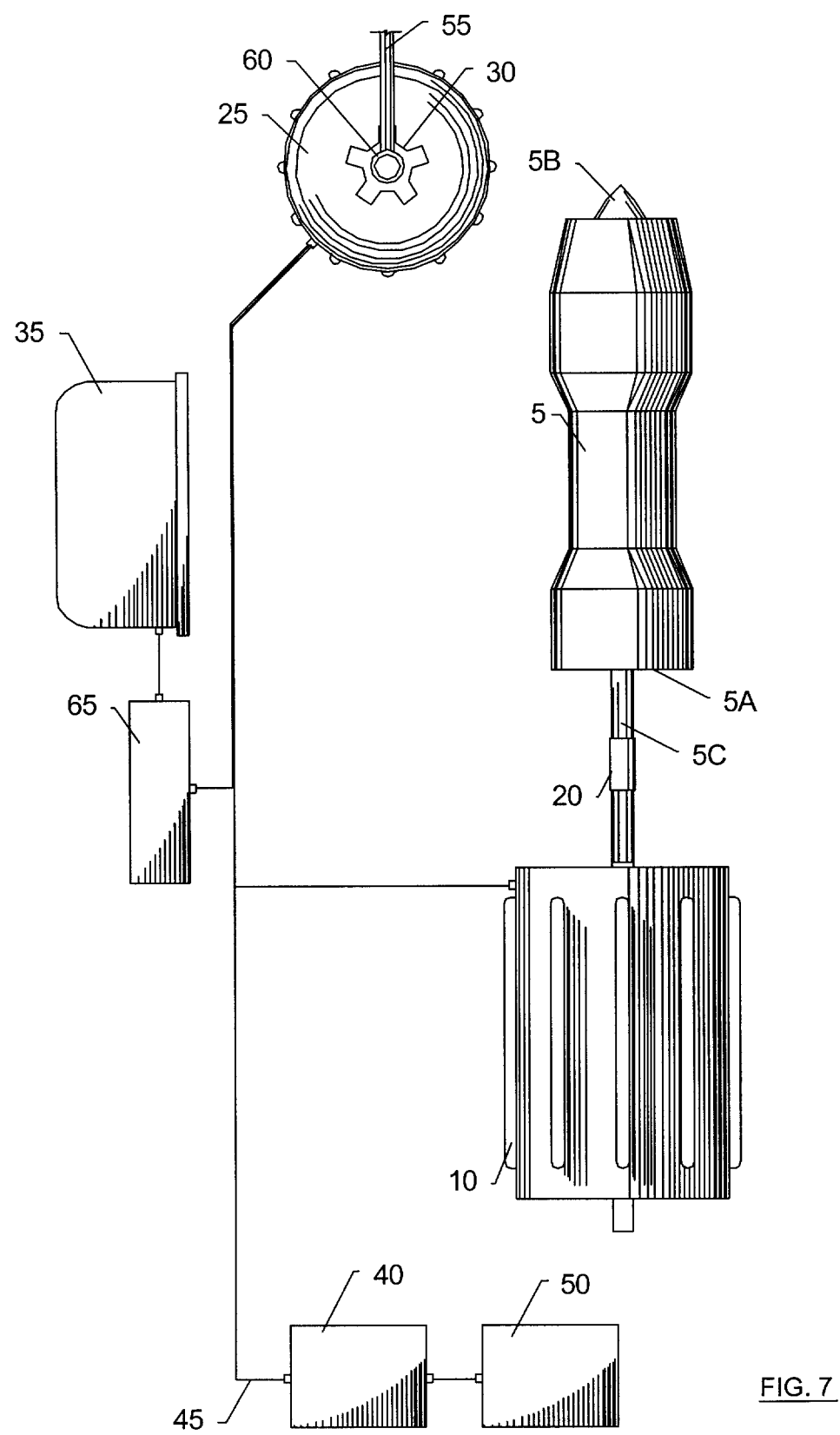
FIG. 7 shows schematically a hybrid propulsion system according to an alternate embodiment of the present invention.

Referring initially to FIGS. 1 and 7, a hybrid propulsion system 1 according to two embodiments of the present invention is shown. In the present context, a hybrid propulsion system is one that provides motive power for an aircraft from two or more disparate power sources. The invention disclosed herein achieves that objective through shaft power provided by an internal combustion engine and electric power provided by one or more batteries. Both power sources, which are described below in more detail, can convert their energy into a form useable by an electric motor that can be used to turn one or more lifting surfaces on an aircraft. In a more particular form, the hybrid propulsion system 1 is a turbo-electric propulsion system that is particularly well-suited to powering a rotary-winged aircraft such as a helicopter or autogyro. Referring with particularity to FIG. 1, the components making up hybrid propulsion system 1 are arranged in a lateral configuration, while referring with particularity to FIG. 7, the components making up hybrid propulsion system 1 are arranged in an in-line configuration. The choice of which configuration is dictated by weight, volume and related aircraft integration concerns, among other things. As such, either of the hybrid propulsion systems 1 depicted in FIGS. 1 and 7 are applicable to any of the aircraft shown in the remaining drawings, subject to configurational limitations imposed by the aircraft.

System 1 includes as the first of these motive power sources a gas turbine engine 5 with inlet 5A and exhaust 5B. An electric generator 10 is connected to the engine 5 through a primary transmission shaft 15 that extends perpendicularly between them so that rotational movement of the engine shaft 5C imparts comparable rotational movement within the generator 10. Generator 10 can be of either an alternating current (AC) or direct current (DC) variety, although the remainder of this disclosure will focus on the DC variant, since such a configuration will abrogate the need for a battery-charging rectifier. Primary transmission shaft 15 is shown in simplified fashion as extending directly from engine shaft 5C in front of engine inlet 5A for ease of visualization. As will be appreciated by those skilled in the art, primary transmission shaft 15 is preferably in the form of a power take-off shaft that passes through the inside of an inlet guide vane (not shown) or strut of the engine's fan or compressor section (neither of which are shown). A clutch 20 is used to allow the engine 5 and generator 10 to be selectively decoupled from one another at the primary transmission shaft 15. In one form, clutch 20 utilizes a mechanical friction plate to facilitate the necessary connection and disconnection. Such disconnection allows the engine 5 to operate independently for jet flight (which may be particularly useful for fixed wing aircraft). Connection of the primary transmission shaft 15 to DC electric generator 10, as well as connection of the primary transmission shaft 15 to the engine 5 can be effected by known means, such as a worm gear connection, bevel gear connection or the like. The DC electric generator 10 is capable of supplying adequate DC current to run the DC electric motor 25, which in turn can supply sufficient power to turn a propeller (or related bladed rotor) 30 (presently shown with only blade roots) that is used to provide lift to the aircraft.

The second source of motive power may come from one or more external battery packs 35. Rather than converting the rotational mechanical energy of the engine 5 and primary transmission shaft 15 into DC electric current through the generator 10 to provide the DC electric motor 25, the external battery packs 35 provide it directly to the motor 25. While such a battery pack 35 may be made large enough to provide aircraft motive power for relatively long durations of flight, the present inventor has recognized that a battery pack 35 so sized may be impractically heavy, bulky or the like. As such, the battery pack 35 should be sized to provide such motive power for short-term operation, the duration of which is dictated by anticipated mission or emergency requirements.

Switching between the two power sources of engine 5 and external battery pack 35 is effected through a controller 40 that may be connected to one or more actuators (not shown) through either cables 45 for hardwired connection or a wireless transceiver 50. For example, if a determination is made (such as through pilot input, for example) that motive power is to be provided to the aircraft through the external battery pack 35, the controller 40 can instruct the clutch 20 to decouple the primary transmission shaft 15 from engine 5. Such disconnection may be particularly advantageous in circumstances where operation of the engine 5 is inoperable or potentially harmful or wasteful. For example, powering the bladed rotor 30 through electricity provided by the external battery pack 35 can be used to run an aircraft in a low thermal output mode until such time as it is determined appropriate to rely upon the engine 5 for such motive power. In one form, controller 40 is a computer (i.e., microprocessor)-based system that can control some or all aspects of the aircraft flight envelope. Such allows preprogrammed automation of actuator functions, as well as the ability to accept input control signals from a remote location, in the case of unmanned air vehicles (UAVs), through transceiver 50.

A secondary transmission shaft 55 can be used to supply power to additional rotor(s), such as a rotor for horizontal stabilization (in the case of a single rotor helicopter or the like), or a second lifting rotor in the case of a tandem-rotor helicopter. Another clutch 60 can be used in a manner generally similar to clutch 20 to selectively couple the DC electric motor 25 and bladed rotor 30. Disconnection of bladed rotor 30 from the engine 5 and battery pack 35 through clutch 60 permits the bladed rotor 30 to freely spin, which may be advantageous during emergency procedures as it allows the aircraft to operate in an autogyro mode with a more controlled descent. Likewise, clutch 60 can enable the aircraft to run on electric power supplied by an appropriately sized internal battery pack (discussed below) for start-up and other ground operations.

As will be appreciated by those skilled in the art, operation of the engine 5 to turn the bladed rotor 30 involves the conversion of mechanical (shaft) energy in the engine 5 to electrical energy in the generator 10 and back into mechanical energy at the motor 25. Reductions in propulsion system 1 efficiency due to losses attendant to each conversion are more than offset by the increased functionality that arises out of having both the engine 5 and external battery pack 35 provide motive power to the aircraft. The present inventor has discovered that at least for UAVs, autogyros, small single rotor helicopters and related craft, the present invention an related benefits provided thereby is a practical way to achieve desirable system redundancy and multiple modes of operation.

An internal battery pack 65 capable of providing start up power and powering any needed internal systems is also provided. Such internal battery pack 65 may be connected to an auxiliary power unit (APU, not shown) to effect such starting and aircraft support functions. In addition to clutches 20 and 60, controller 40, which for example is a microprocessor-based system, may among other things, control operation of the battery packs 35 and 65, speed of the DC electric motor 25, and pitch of bladed rotor 30. Wireless transceiver 50 may, in addition to providing local controls within the aircraft, receive fly-by-wire commands for unmanned operation, such as in a UAV. In such a case, the wireless transceiver 50 and controller 40 may cooperate to provide complete automated electronic (i.e., computerized) robotic control of the aircraft over a part or the entirety of its mission. In a latter example, such robotic control may include take-off and landing, as well as in-flight maneuvers. Cable 45 or related wiring, such as that familiar to those skilled in the art, is used to provide electrical connectivity between the various components. Such connectivity can be used to provide low current control and information signals, as well as high current to the DC electric motor 25 and related motive power componentry.

There are at least three types of DC electric motors 25 available, generally categorized as traditional, brushless, and coreless. Traditional DC motors use a core of iron bound with copper or other highly conductive wire. The core is centered in a series of magnets such that power (in the form of electric current) is transmitted to the core via graphite brushes. In the present context, the electric current is DC coming from the generator 10 or battery pack 35. Brushless motors use many of the same materials as the traditional DC motor configuration, but reverse them, placing the magnets in the center surrounded by the copper wiring. Power is supplied to the copper wiring, which allows the magnet to spin. The coreless motors are arranged in the same manner as traditional DC motors, but replace the iron and copper with aluminum meshes bound in glass epoxy. The choice of motor 25 configuration can be readily made depending on (among other factors) the type of application, as well as motor availability, weight and cost. These factors being equal, the brushless type is preferred for both the generator and the rotor motors due to the brushless motor's greater reliability and longevity.

Traditional DC electric motors, with significant amounts of metallic wiring wrapped around magnetizable poles, tend to be heavy. To reduce the weight associated with such motors, the present inventor has discovered that DC electric motors 25 could be tailored to specific parts of the envelope, where maximum power (and concomitant motor size) may not be required. For example, if the DC electric motors 25 could be used for limited periods in relatively lightly-loaded segments (such as hover in the case of a helicopter), then such could provide separate utility over the power coming from the gas turbine engine 5 that would be used for take-off or related maneuvers that require maximum amounts of power. In a related way, the DC electric motor 25 can be configured to not be the sole source of motive power. In such circumstances, smaller, lighter weight motors can be used effectively. Other weight-reducing schemes could further be employed. For example, the majority of the weight of a DC electric motor 25 comes from the motor housing, which is usually steel or a related iron-based metal. Such weight could be significantly reduced by using a lightweight, composite material for the motor housing such as high heat resistant thermoset resins with fiber glass reinforcement or newer, high strength, high heat resistant organic film. Further weight reduction would be possible by replacing the iron core magnets with rare earth cobalt (or related) magnets. Other options, such as nickel-metal hydride and lithium ion batteries used to provide power to hybrid automobiles could be used to provide the necessary power without the significant weight penalties of traditional electric motors. The power requirements of the engines are based on the size and configuration of the aircraft. For example, a U.S. Chinook helicopter requires about 4900 shaft horsepower to turn the blades at approximately 225 revolutions per minute, generating around 113600 foot-pounds of torque. Likewise, a U.S. Black Hawk helicopter requires about 1900 shaft horsepower to turn the blades at approximately 260 revolutions per minute, generating around 39500 foot-pounds of torque.

Although the DC generator 10 and the gas turbine engine 5 are shown in a side-by-side relationship in the figure, it will be appreciated by those skilled in the art that an axially aligned (i.e., in-line) configuration, such as that shown in FIG. 7, may be preferred. For example, the DC generator 10 could be disposed longitudinally in front of the gas turbine engine 5 such that primary shaft 15 extends forward from the inlet 5A of engine 5 such that shaft 15 spins along an axis common to both the engine 5 and the DC generator 10. Such an in-line configuration could make for a more efficient transfer of power from the engine 5 to the generator 10, as loss due to the right angled gearing is removed. By positioning the generator 10 sufficiently ahead (for example, ten to twelve feet) of the inlet 5A, the incidence of inlet distortion of the air entering the inlet 5A is reduced.

Depending on the size of the aircraft, single and multiple gas turbine engines may be utilized. Referring next to FIGS. 2A through 6B, top and elevation drawings of the incorporation of various embodiments of the present hybrid propulsion system 1 into numerous aircraft configurations are shown. Aircraft employing the present hybrid propulsion system 1 possess numerous attributes, including the ability to take off vertically and hover. In addition, helicopter configurations are capable of autogyro mode during flight, where in autogyro mode, directional steering can be accomplished by varying the speed of the jet engine 5 and the rotors 30 in the outboard rotor configuration. Such could reduce (or outright do away with) the need for the tail rotor and its attendant weight and complexity.

Figure 2A:
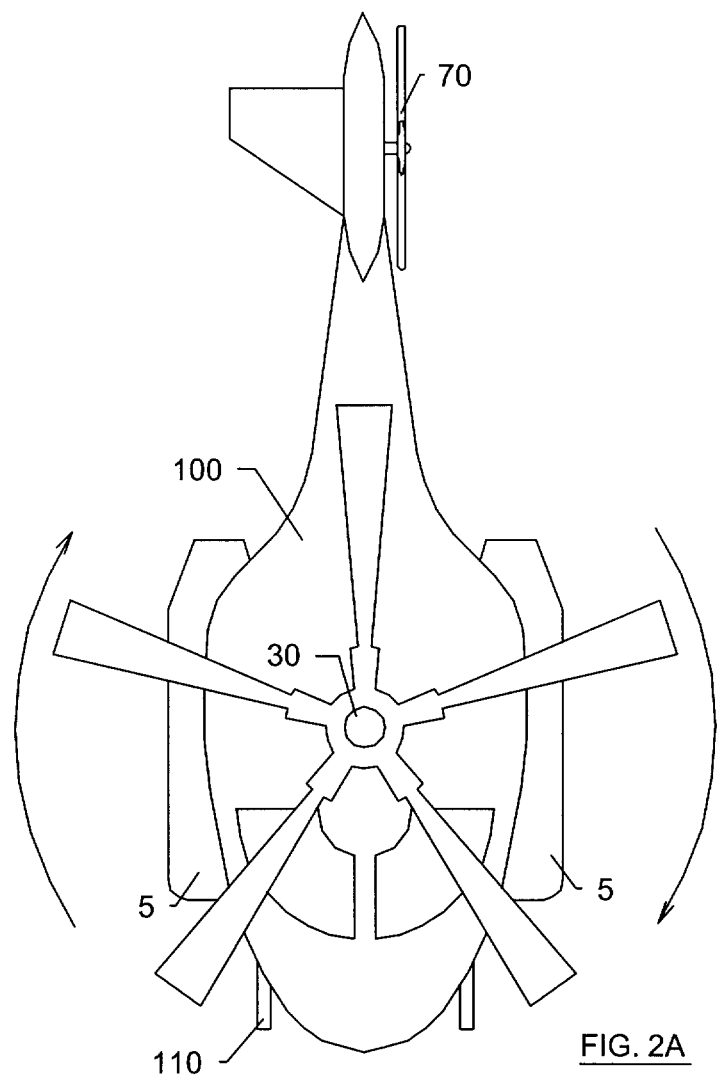
FIG. 2A shows a top view of a rotary-winged aircraft with a single main rotor and horizontal stability rotor, utilizing a pair of the hybrid propulsion systems of FIG. 1.
Figure 2B:
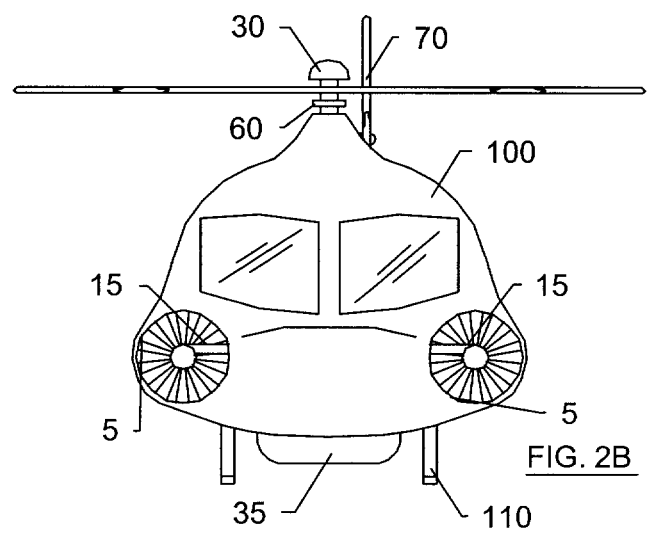
FIG. 2B shows a front elevation view of the rotary-winged aircraft of FIG. 2A.

Referring with particularity to FIGS. 2A and 2B, a single rotor helicopter 100 is shown. Two gas turbine engines 5 are situated on laterally opposing sides of the helicopter 100, and both (through respective shafts 15) can provide motive power to the bladed rotor 30. In addition, the transmission shafts 15 connect the engine 5 with the DC electric generator 10. The bladed rotor 30 can be of any configuration deemed appropriate for the aircraft; in the embodiment shown by way of non-limiting example, it may have from two to five blades to provide adequate lift. Landing rails 110 or wheels (not presently shown) may be used for ground engagement or transport. Another bladed rotor 70 is situated in the tail of helicopter 100 and is configured to provide horizontal stability.

Figures 3A, 3B:
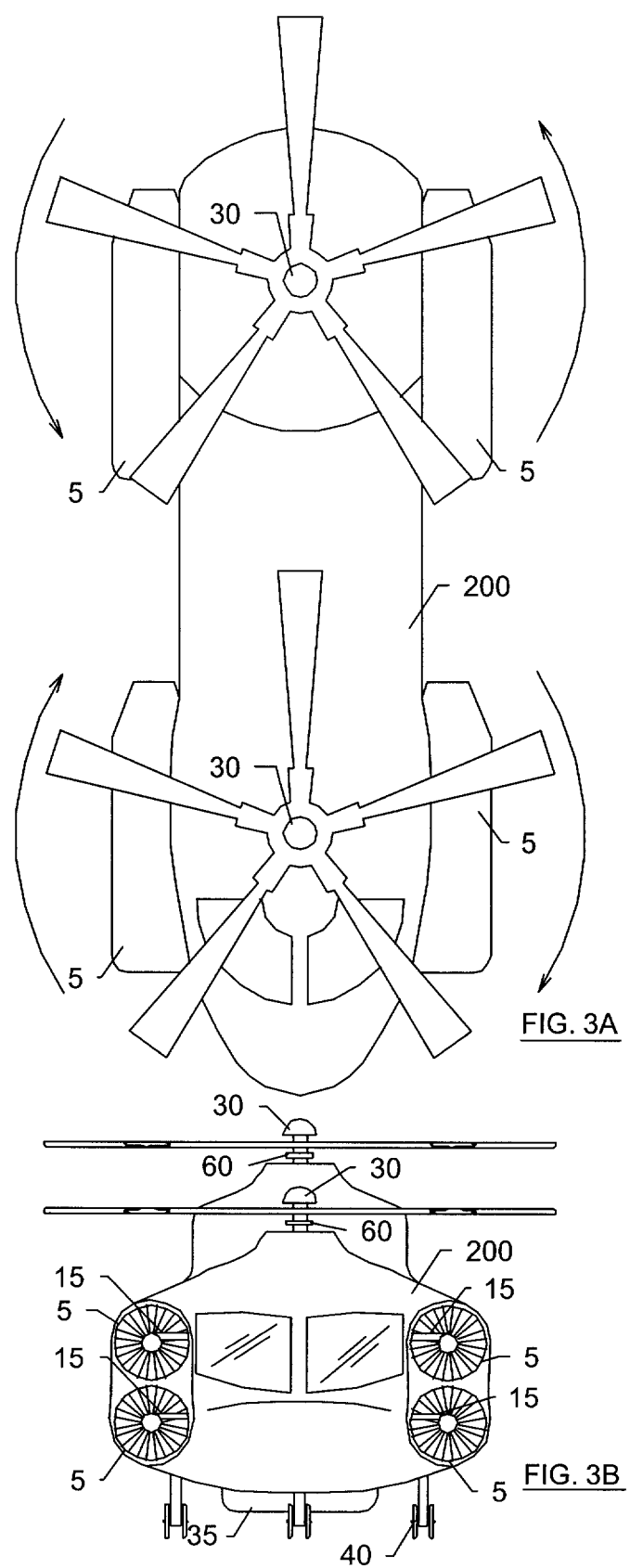
FIG. 3A shows a top view of a rotary-winged aircraft with a front-to-back dual rotor configuration, utilizing four of the hybrid propulsion systems of FIG. 1.
FIG. 3B shows a front elevation view of the rotary-winged aircraft of FIG. 3A.

Referring with particularity to FIGS. 3A and 3B, a larger helicopter 200 with a front-to-back dual rotor configuration utilizing the hybrid propulsion system 1 discussed above is shown. Such a helicopter is particularly well-suited to heavy lifting operations. The bladed rotors 30 can be made to counter-rotate, thereby eliminating the need for an anti-torque vertical rotor such as the horizontally-stabilizing bladed rotor 70 of the device depicted in FIGS. 2A and 2B.

Figure 4A:
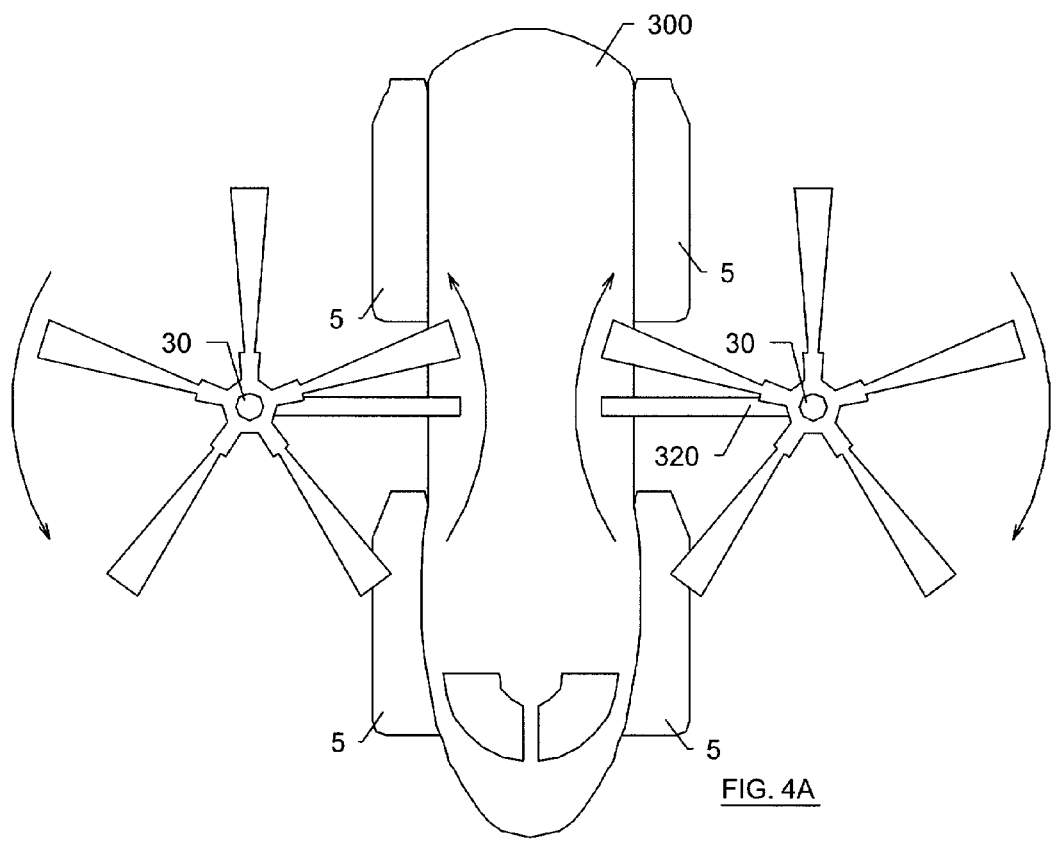
FIG. 4A shows a top view of a rotary-winged aircraft with a side-to-side dual rotor configuration, utilizing four of the hybrid propulsion systems of FIG. 1.
Figure 4B:
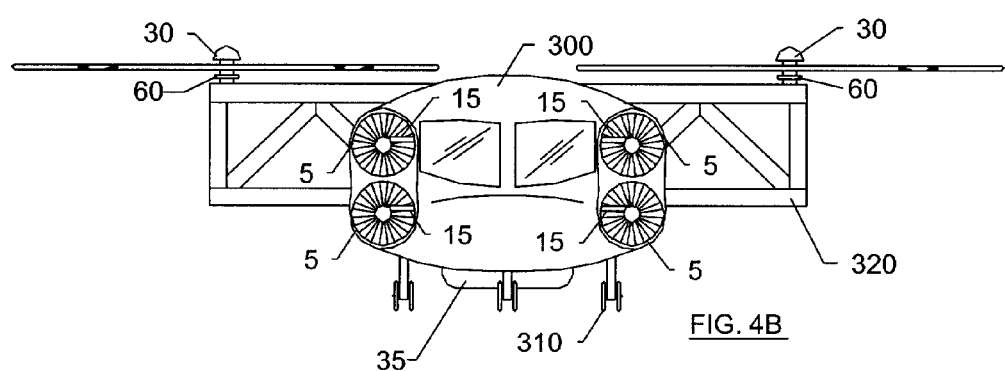
FIG. 4B shows a front elevation view of the rotary-winged aircraft of FIG. 4A.

Referring with particularity to FIGS. 4A and 4B, a side-by-side configuration of helicopter 300 is shown. Landing wheels 310 are included. In this configuration, a lateral frame 320 is included to transmit weight and lifting loads between the bladed rotors 30 and the fuselage of helicopter 300. Likewise, a side-by-side configuration of helicopter 600 is shown, where the propulsion system is configured as the in-line variant of FIG. 7. Lateral frame 620 is used in a manner generally similar to lateral frame 320 of the device shown in FIGS. 4A and 4B. Horizontal and vertical stability fins 625, similar to those used on fixed-wing aircraft, are also shown.

Figure 5A:
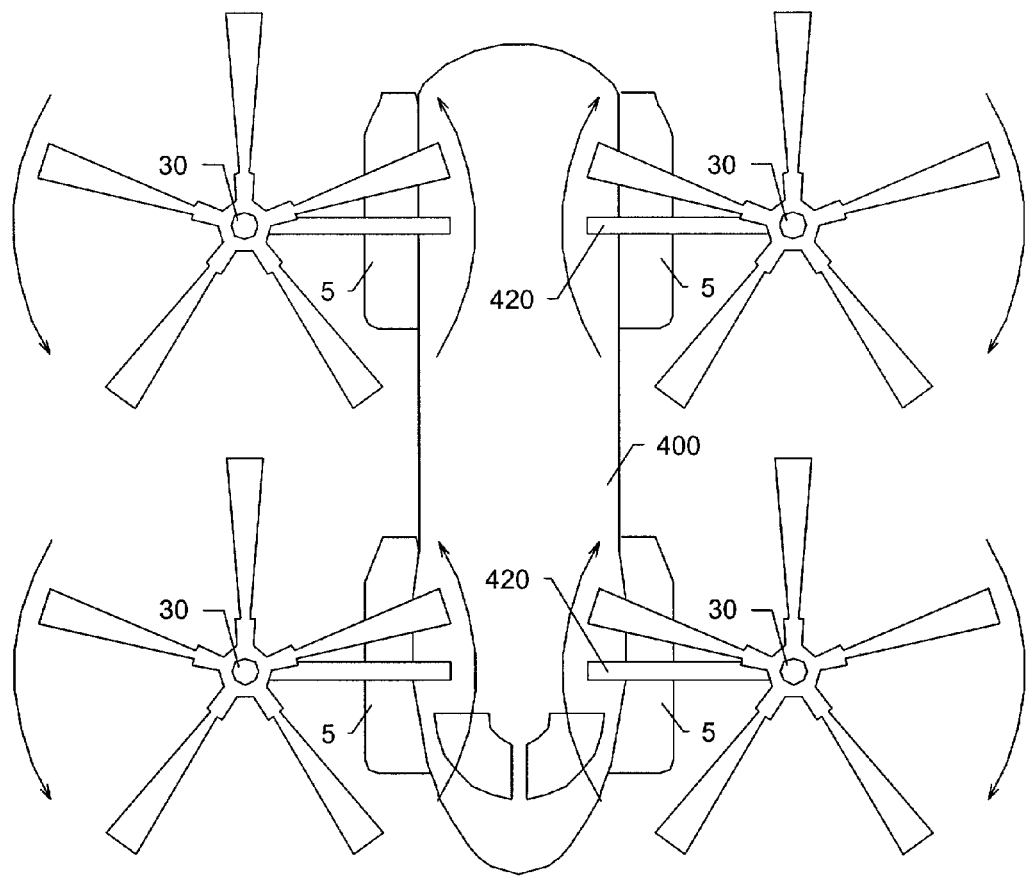
FIG. 5A shows a top view of a rotary-winged aircraft with a side-to-side and front-to-back quadruple rotor configuration, utilizing eight of the hybrid propulsion systems of FIG. 1.
Figure 5B:
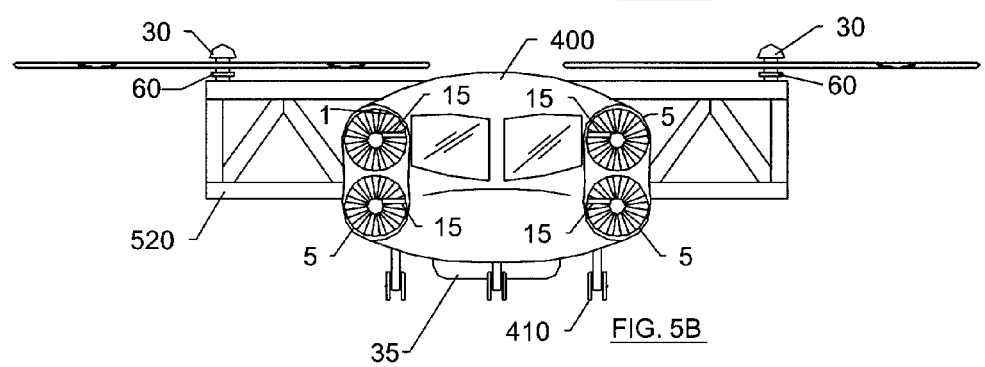
FIG. 5B shows a front elevation view of the rotary-winged aircraft of FIG. 5A.

Referring with particularity to FIGS. 5A and 5B, a helicopter 400 including a combination of the features of the embodiments of FIGS. 3A, 3B, 4A and 4B are shown. Such a front-to-back quad rotor configuration utilizes eight of the hybrid propulsion systems.

Figure 6A:
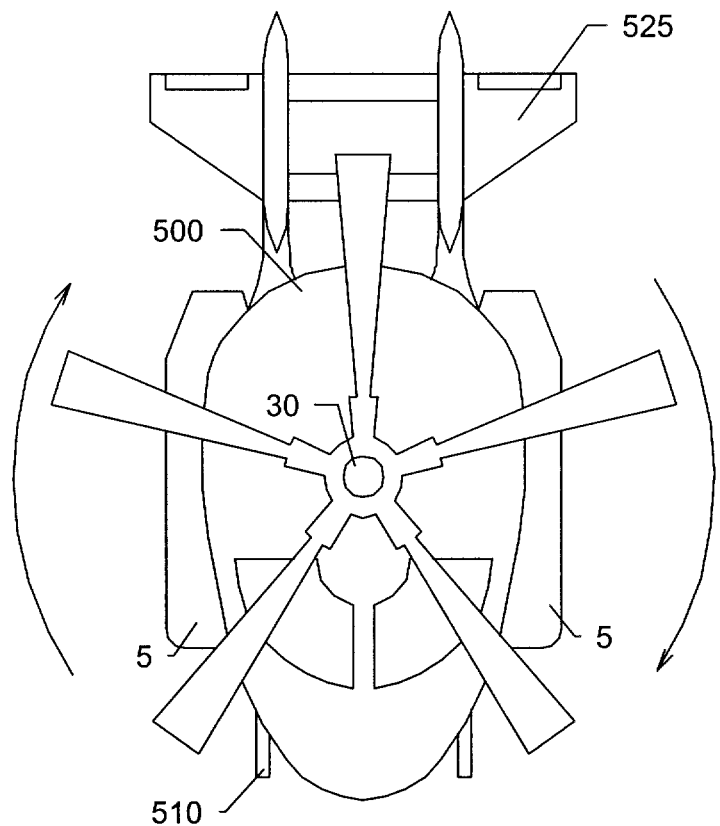
FIG. 6A shows a top view of a rotary-winged aircraft with a single rotor auto gyro configuration utilizing a pair of the hybrid propulsion systems of FIG. 1.
Figure 6B:
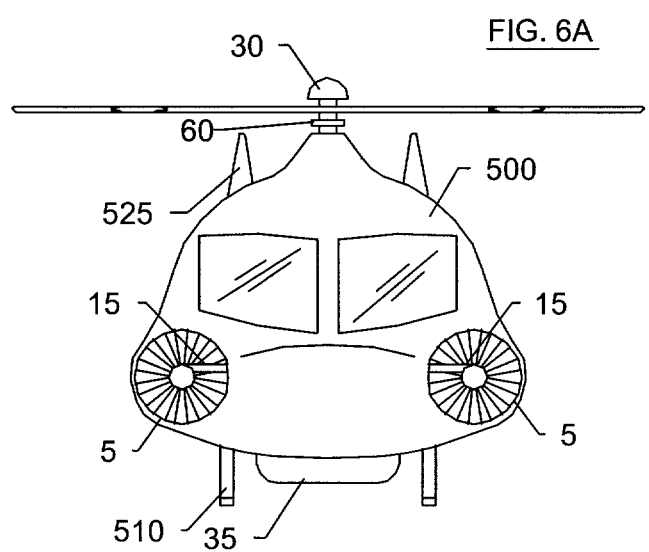
FIG. 6B shows a front elevation view of the rotary-winged aircraft of FIG. 6A.
Figure 8A:
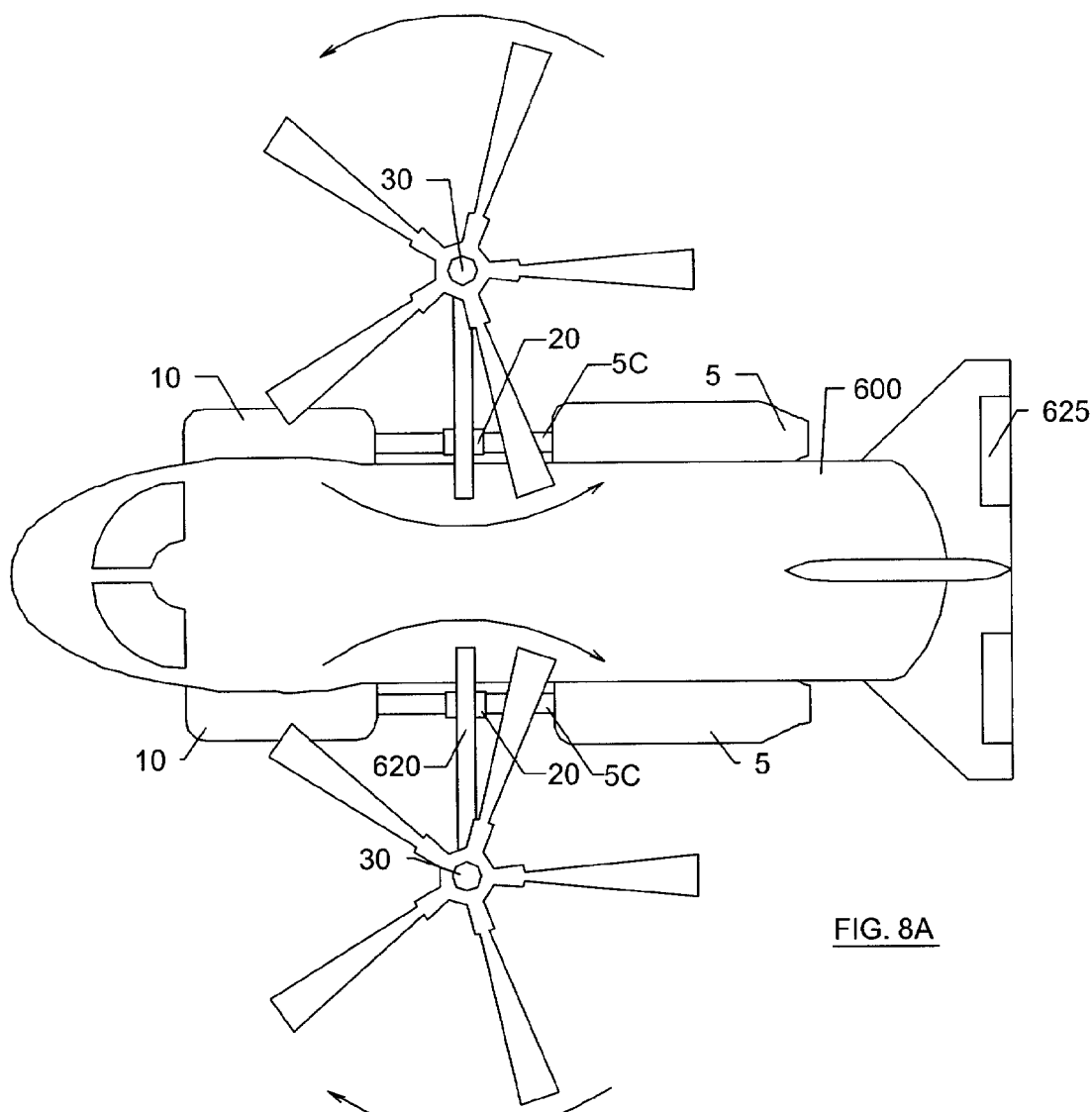
FIG. 8A shows a top view of a rotary-winged aircraft with a side-to-side dual rotor configuration, utilizing four of the hybrid propulsion systems of FIG. 7.
Figure 8B:
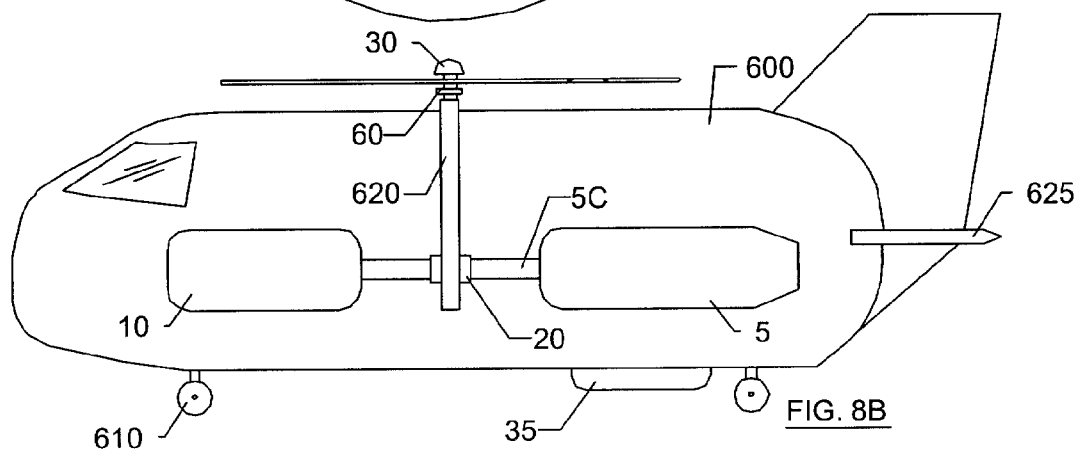
FIG. 8B shows a front elevation view of the rotary-winged aircraft of FIG. 8A

Referring next to FIGS. 6A and 6B, as well as 8A and 8B, gyrocopters 500 and 600 are shown. Gyrocopters share numerous features with helicopters (such as those shown in FIGS. 2A through 5B), but can not take off vertically nor hover the way a helicopter can. Nevertheless, the infinite variability of the speed of the rotors and the turbine for directional steering in this invention makes a tail rotor unnecessary. Horizontal and vertical stability fins 525 (in the single rotor variant depicted in FIGS. 6A and 6B) and 625 (in the twin rotor variant depicted in FIGS. 8A and 8B), such as those found on fixed-wing aircraft, are shown. Gyrocopter 600 highlights a particularly advantageous configuration that uses the in-line configuration of the propulsion system 1 that is depicted in FIG. 7.

While certain representative embodiments and details have been shown for purposes of illustrating the invention, it will be apparent to those skilled in the art that various changes may be made without departing from the scope of the invention, which is defined in the appended claims.

What is claimed is:

1. A rotary wing aircraft comprising:
    a fuselage;
    at least one bladed rotor cooperative with said fuselage; and
    a hybrid propulsion system coupled to said fuselage and said at least one bladed rotor, said hybrid propulsion system comprising:
        a gas turbine engine;
        an electrical generator cooperative with said gas turbine engine such that mechanical power received therefrom by said electrical generator is converted to electric power;
        an electric storage device; and
        an electric motor configured to selectively engage said at least one bladed rotor to impart relative rotational motion therebetween and selectively coupled to at least one of said electrical generator and said electric storage device such that during a first portion of a flight envelope of said aircraft, said gas turbine engine and said electric motor provide propulsive power to said aircraft, and during a second portion of said flight envelope, said electric storage device and said electric motor provide said propulsive power to said aircraft.

2. The rotary wing aircraft of claim 1, wherein said aircraft is a helicopter.

3. The rotary wing aircraft of claim 2, wherein said at least one bladed rotor comprises a plurality of lift rotors.

4. The rotary wing aircraft of claim 3, wherein said plurality of lift rotors comprises tandem rotors.

5. The rotary wing aircraft of claim 3, wherein said plurality of lift rotors comprises side-by-side rotors arranged to rotate in opposite directions of one another.

6. The rotary wing aircraft of claim 1, wherein said electric storage device comprises at least one battery.

7. The rotary wing aircraft of claim 1, further comprising a controller configured to vary aircraft operation over at least a portion of a flight envelope of said rotary wing aircraft.

8. The rotary wing aircraft of claim 7, wherein said at least a portion of a flight envelope of said rotary wing aircraft comprises a substantial entirety of said flight envelope.

9. The rotary wing aircraft of claim 1, wherein said aircraft is a gyrocopter.

10. The rotary wing aircraft of claim 1, further comprising a clutch to provide selective engagement between said gas turbine engine and said electrical generator.

\* \* \* \* \*

UNITED STATES PATENT AND TRADEMARK OFFICE
CERTIFICATE OF CORRECTION

Page 1 of 1

PATENT NO. : 8,727,271 B2
APPLICATION NO. : 11/972879
DATED : May 20, 2014
INVENTOR(S) : Ival O. Salyer It is certified that error appears in the above-identified patent and that said Letters Patent is hereby corrected as shown below:

In the Specification

Col. 1, Lines 16,
  "vehicles (such as an airplane) or rotary-wing vehicles (such" should read
  --vehicles (such as an airplane) or rotary-wing vehicles (such as--;

Col. 1, Line 47,
  "speed varies depending on the aircraft type, size and intended" should read
  --speed which varies depending on the aircraft type, size and intended--; and Col. 6, Line 61,
  "helicopters and related craft, the present invention an related" should read
  --helicopters and related craft, the present invention and related--.

Signed and Sealed this
Third Day of March, 2015

Michelle K. Lee
*Deputy Director of the United States Patent and Trademark Office*